United States Patent
Sabol et al.

(10) Patent No.: US 12,282,679 B2
(45) Date of Patent: Apr. 22, 2025

(54) STORAGE DESIGN FOR HOST CONTROLLED LOGICALLY ADDRESSED FLEXIBLE DATA LAYOUT

(71) Applicant: Google LLC, Mountain View, CA (US)

(72) Inventors: Christopher Sabol, Los Altos, CA (US); Manuel Benitez, Cupertino, CA (US)

(73) Assignee: Google LLC, Mountain View, CA (US)

( * ) Notice: Subject to any disclaimer, the term of this patent is extended or adjusted under 35 U.S.C. 154(b) by 224 days.

(21) Appl. No.: 17/864,068

(22) Filed: Jul. 13, 2022

(65) Prior Publication Data

US 2023/0019966 A1 Jan. 19, 2023

Related U.S. Application Data

(60) Provisional application No. 63/222,221, filed on Jul. 15, 2021.

(51) Int. Cl.
| | |
|---|---|
| *G06F 3/06* | (2006.01) |
| *G06F 12/02* | (2006.01) |
| *G06F 12/0884* | (2016.01) |
| *G06F 12/0891* | (2016.01) |

(52) U.S. Cl.
CPC ........ *G06F 3/0652* (2013.01); *G06F 12/0253* (2013.01); *G06F 12/0884* (2013.01); *G06F 12/0891* (2013.01); *G06F 3/0616* (2013.01); *G06F 3/0626* (2013.01); *G06F 3/0679* (2013.01)

(58) Field of Classification Search
CPC ............. G06F 12/0246; G06F 12/0253; G06F 12/0884; G06F 12/0891; G06F 2212/7205; G06F 1/1616; G06F 1/1641; G06F 1/1652; G06F 1/1681; G06F 3/0616; G06F 3/0626; G06F 3/0652; G06F 3/0679

See application file for complete search history.

(56) References Cited

U.S. PATENT DOCUMENTS

| | | | |
|---|---|---|---|
| 9,229,854 B1 * | 1/2016 | Kuzmin | G06F 3/0679 |
| 2002/0188592 A1 * | 12/2002 | Leonhardt | G06F 16/10 |
| 2008/0307192 A1 * | 12/2008 | Sinclair | G06F 12/0246 |
| | | | 711/218 |
| 2016/0321010 A1 * | 11/2016 | Hashimoto | G06F 3/0608 |
| 2018/0276118 A1 * | 9/2018 | Yanagida | G06F 12/0246 |
| 2019/0377494 A1 | 12/2019 | Rao et al. | |

OTHER PUBLICATIONS

Extended European Search Report for European Patent Application No. 22185030.8 dated Dec. 7, 2022. 10 pages.

* cited by examiner

*Primary Examiner* — Jane W Benner
(74) *Attorney, Agent, or Firm* — Lerner David LLP (57) ABSTRACT

A drive placement or placement functionality can enable initial copies of data to be placed on a drive in reclaim unit (HRUs) in a manner which is probabilistically more efficient from a garbage collection (GC) perspective and leverages knowledge of a host or application using the data. The placement functionality enables the advantages of fine-grained placement functionality while simultaneously allowing a storage device or storage drive to maintain NAND or other management responsibility, and not allocate that responsibility to an application or host device using the device.

19 Claims, 5 Drawing Sheets

STORAGE DESIGN FOR HOST CONTROLLED LOGICALLY ADDRESSED FLEXIBLE DATA LAYOUT

CROSS REFERENCE TO RELATED APPLICATION

This application claims the benefit of the filing date of U.S. Provisional Patent Application No. 63/222,221, filed on Jul. 15, 2021, the disclosure of which is incorporated herein by reference.

BACKGROUND

Solid state drive (SSD) designs have historically provided a block-based input/output (IO) interface similar to those found in hard drives. However, the use of block-based IO limits the ability of host software to optimize the placement of data for garbage collection efficiency. Garbage collection efficiency improves the life of the drive, increases the maximum write rate available to the application, and can enable reduced storage space for garbage collection reserves. This in turn can decrease the cost of flash per unit of usable storage.

One approach to enabling the host software to make optimized placement decisions requires managing the flash at a physical level. Yet, with this approach, the host software must take ownership of NAND memory management operations, which leads to additional complexity. This can include the host software managing tasks like wear leveling, retention effect compensation, read-disturb compensation, and other NAND or solid-state drive (SSD) memory specific effects. Further, NAND changes in form, factor, formatting, or architecture can further create more complicated NAND level management tasks for the NAND. Additionally, as a flash drive contains a flash translation table, this direct management, also referred to as an open channel model, must require that the table be maintained on the host software. Thus, each host software must deal with atomic updates to the table, which is a performance bottleneck. All updates would be serialized at one point outside of the drive. In addition, this would not use typical hard drive interfaces and would preclude the use of some advanced SSD IO paths, such as non-volatile memory express (NVMe) over fabrics. In addition, with such an approach layout control would be prevented across a virtual machine interface boundary.

Zoned namespaces (ZNS) attempt to leverage work done in hard disk drives (HDDs) and shingled magnetic recording (SMR) drives to accomplish some of the efficiencies described above. NVMe Streams also attempt to provide similar functionality described above. However, while these and other mechanisms may allow a host to control some of the macro level of isolation within an SSD drive, they do not enable the fine grain placement control, which precludes substantial optimizations like controlling placement of data on particular dies and balancing garbage collection (GC) overhead and drive read/write throughput.

SUMMARY

Aspects of the disclosed technology are related to drive placement functionality, allowing initial copies of data to be placed on a drive in a hardware reclaim unit (HRUs) in a manner which is more efficient from a garbage collection (GC) perspective.

Aspects of the disclosed technology include a method for storing data by a host in a memory. The method can include any combination of receiving, by the host, information related to data to be written to the memory; analyzing, by the host, information related to the data to be written to the memory; selecting, by the host based on the analyzed information, one or more placement identifiers (IDs) on which to store the data; writing by a memory controller, responsive to a command by the host, data within an area of the memory corresponding to the one or more selected placement IDs. Each placement ID of the one or more placements IDs can uniquely identify a combination of a parallel unit and a reclaim unit stream within the parallel unit.

A reclaim unit stream can include one or more reclaim units, wherein each reclaim unit can be a logical division of the storage and is erasable through a single erase operation. A reclaim unit can correspond to a physical reclaim unit or other discrete memory unit. One or more reclaim units can be queried to obtain information about the data stored on the one or more reclaim units. A selected placement ID can be chosen by the host based on a garbage collection operation metric that is related to the data to be placed on the area of memory corresponding to the one or more selected placement IDs. The host can initiate a garbage collection operation within the area of memory corresponding to the selected placement ID. Garbage collection operations for areas outside the selected placement ID can be performed by the memory controller. Commands for reading the data which is written to the storage can be sent directly to the memory controller. Disk maintenance operations can be conducted by a drive controller.

The selection of a placement ID by the host can include at least one of the following factors: (i) an application read and write performance requirement related to the data to be written; (ii) an expected lifetime of the data to be written; (iii) an expected sequential object size of the data to be written; or (iv) maintenance of a number of active logical block addresses across parallel units to be below a set parameter or approximately the same.

The placement ID can be logically addressable by the host. Analyzing information related to the data can include at least one of: (i) determining read and write performance requirements of the data to be written; (ii) determining an expected time to deletion of the data to be written; or (iii) comparing the size of the data to be written to the size of a reclaim unit within the area of memory corresponding to the one or more selected placement IDs.

Aspects of the disclosed technology can include a system. The system can include a storage device; one or more processing devices coupled to a memory containing instructions, the instructions causing the one or more processing devices to receive, by a host device, information related to data to be written to the storage device; analyze, by the host device, information related to the data to be written to the storage device; select, by the host device based on the analyzed information, one or more placement identifiers (IDs) on which to store the data; write, by a storage device controller, responsive to a command by the host device, data within an area of the memory corresponding to the one or more selected placement IDs. Each placement ID of the one or more placements IDs can uniquely identify a combination of a parallel unit and a reclaim unit stream within the parallel unit. A reclaim unit stream can comprise one or more reclaim units, wherein each reclaim unit is a logical division of the storage and is erasable through a single erase operation. The host device can initiate a garbage collection operation within the area of the storage device corresponding to the selected placement ID. Commands for reading the data written to the storage can be sent directly to the memory controller.

Aspects of the disclosed technology can include a method for creating a placement identifier (ID) for use by a host device. The method can comprise identifying, a parallel unit within a storage device; identifying a plurality of reclaim unit streams within the parallel unit; creating the placement ID for each reclaim unit stream of the plurality of reclaim unit streams, the placement ID logically addressable by the host device and corresponding to an erasable section of storage within the storage device; and storing, in a host device accessible database on the storage, the placement ID. At least one of a host device logical block address, a logical block address, or host device reclaim unit address related to the placement ID can be stored in the host device accessible database.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

Reference numerals that are repeated across plural figures are intended to identify the same features in various examples and figures.

DETAILED DESCRIPTION

Overview

The present disclosure provides a storage design for host or application-controlled memory through a logically addressed and flexible data layout. In particular, data is placed within a specified reclaim unit (RU) in a parallel unit (PU) on a drive, with such a combination of RU and PU being referred to as a placement identifier (ID). For example, a drive placement functionality, e.g., implemented by a host computing device (sometimes, "host") having one or more processors, may direct the drive to store data in a specified placement ID. By placing data using the drive placement functionality described herein, an efficiency of garbage collection is increased while allowing the drive to perform operations related to the drive, such as wear leveling, retention effect compensation, and read-disturb compensation.

The technology enables fine-grained placement functionality, while simultaneously allowing a storage device or storage drive to maintain NAND management responsibility, rather than allocating that responsibility to an application or host device.

A drive is logically addressed, enabling the technology to be compatible with drive sharing technologies which are standardized, such as for example, Non-Volatile Memory Express (NVMe) over Fabrics (NVMeoF).

Without limitation, the method and techniques are applicable to flash memory and solid-state drives and other similar technologies wherein a block or other unit of memory can be erased.

Example Systems and Methods

Figure 1:
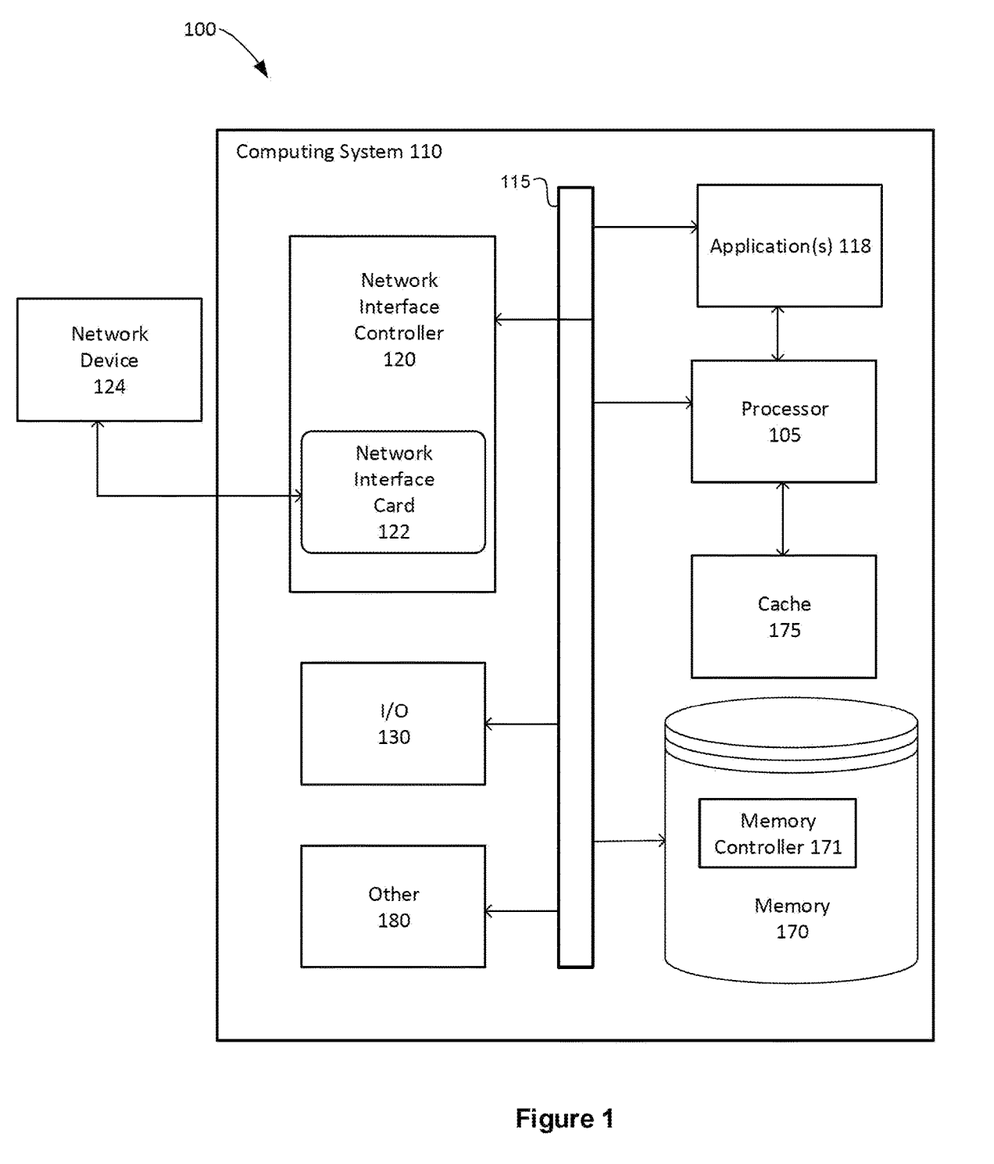
FIG. 1 illustrates an example computing system according to aspects of the disclosed technology.

FIG. 1 is a block diagram illustrating an example computing system 110 with which aspects of this disclosure, and any components thereof, can be implemented. In certain aspects, the computer system 110 may be implemented using hardware or a combination of software and hardware, for example in a dedicated server, integrated into another entity, or distributed across multiple entities. In some examples, computing system 110 can be a user computing system or device. In other examples the computing system 110 can be coupled with one or more memories or storage devices though a high-speed link or other physical or logical connector. One or more example computer systems, similar to computing system 110, may be coupled or linked via software and hardware components to operate collectively as a computer system. In some examples, a host can be a server or computer, such as computing system 110, or a software running thereon, which can control or operate in conjunction with storage memories, such as memory 170.

In broad overview, the computing system 110 includes at least one processor 105 for performing actions in accordance with instructions and one or more memory devices ("memory") 170 or 175 for storing instructions and data. The illustrated example computing system 110 includes the processor 105 in communication, via a bus 115, with at least one network interface controller 120 with one or more network interface cards 122 connecting to one or more network devices 124, memory 170, and any other devices 180, e.g., an I/O interface. The network interface card 122 may have one or more network interface driver ports to communicate with the connected devices or components. Generally, a processor 105 executes instructions received from memory. The processor 105 illustrated incorporates, or is directly connected to, cache memory 175.

In more detail, the processor 105 may be any logic circuitry that processes instructions, e.g., instructions fetched from the memory 170 or cache 175. In many embodiments, the processor 105 is a microprocessor unit or special purpose processor. The computing system 110 may be based on any processor, or set of processors, capable of operating as described herein. The processor 105 may be a single core or multi-core processor. The processor 105 may be multiple processors. In some implementations, the processor 105 can be configured to run multi-threaded operations. In some implementations, the processor 105 may host one or more virtual machines or containers, along with a hypervisor or container manager for managing the operation of the virtual machines or containers. In such implementations, the methods shown and described in FIGS. 2-4 can be implemented within the virtualized or containerized environments provided on the processor 105.

The memory 170 may be any device suitable for storing computer readable data. The memory 170 may be a device with fixed storage or a device for reading removable storage media. Examples include all forms of non-volatile memory, media and memory devices, semiconductor memory devices, such as erasable programmable read-only memory (EPROM), electrically erasable programmable read-only memory (EEPROM), synchronous dynamic random access memory (SDRAM), and flash memory devices, magnetic disks, magneto optical disks, and optical discs, such as CD ROM, DVD-ROM, etc. A computing system 110 may have any number of memory devices 170. In some implementations, the memory 170 supports virtualized or containerized memory accessible by virtual machine or container execution environments provided by the computing system 110. Memory 170 may also consist of a number of different types of memory devices. For instance, the memory devices may be implemented using flash memory devices, such as for example NAND flash memory devices, or other types of non-volatile memory devices. In certain implementations, volatile memory devices, such as random-access memory devices, may be used. For purposes of this disclosure, the various implementations described herein will be principally discussed as being implemented using flash memory devices. It will be appreciated, however, that other approaches are possible and other types of memory devices may be used to implement the implementations described herein.

Memory 170 may also contain a memory controller 171 which may obtain or receive memory operation commands from computing system 110. In some examples, memory controller 171 may be a drive controller which provides similar functionality as memory controller 171. When implementing commands received by the memory controller 171 from computing system 110, the commands, operations, or requests may include flash memory read commands, flash memory write commands and flash memory erase commands, as well as other types of flash memory commands, such as for example move commands and/or copy commands. These commands may be performed on memory 170 or flash memory or other data storage device contained within memory 170.

In some examples, computing system 110 may perform operations on memory 170, including but not limited to, performing memory operations, such as for example, read, write or erase operations requested by computing system 110 or application(s) 118 to memory devices 120; garbage collection; and 3) performing data reconstruction or creating data redundancies such as through RAID configurations or reconstruction of data contained on memory 170.

In other examples, as further explained in this disclosure, application 118 may direct certain aspects of memory storage, utilization, or direct the placement of data within a memory at a granular level.

The cache memory 175 is generally a form of computer memory placed in close proximity to the processor 105 for fast read times. In some implementations, the cache memory 175 is part of, or on the same chip as, the processor 105. In some implementations, there are multiple levels of cache 175, e.g., L2 and L3 cache layers.

The network interface controller 120 manages data exchanges via the network interface driver 122 (also referred to as network interface driver ports). The network interface controller 120 handles the physical and data link layers of the open systems interconnection (OSI) model for network communication. In some implementations, some of the network interface controller's tasks are handled by the processor 105. In some implementations, the network interface controller 120 is part of the processor 105. In some implementations, a computing system 110 has multiple network interface driver controllers 120. The network interface driver ports configured in the network interface card 122 are connection points for physical network links. In some implementations, the network interface controller 120 supports wireless network connections and an interface port associated with the network interface card 122 is a wireless receiver/transmitter. Generally, a computing system 110 exchanges data with other network devices 124 via physical or wireless links that interface with network interface driver ports configured in the network interface card 122. In some implementations, the network interface controller 120 implements a network protocol such as Ethernet.

The other network devices 124 are connected to the computing system 110 via a network interface driver port included in the network interface card 122. The other network devices 124 may be peer computing devices, network devices, or any other computing device with network functionality. For example, a first network device 124 may be a network device such as a hub, a bridge, a switch, or a router, connecting the computing system 110 to a data network such as the Internet as shown in FIG. 1.

The other devices 180 may include an I/O interface, external serial device ports, and any additional co-processors. For example, a computing system 110 may include an interface (e.g., a universal serial bus (USB) interface) for connecting input devices, e.g., a keyboard, microphone, mouse, or other pointing device; output devices, e.g., video display, speaker, or printer; or additional memory devices, e.g., portable flash drive or external media drive. In some implementations, a computing device 100 includes an additional device 180 such as a coprocessor, e.g., a math co-processor can assist the processor 105 with high precision or complex calculations.

Instructions on computing system 110 may control various components and functions of computing system 110. For example, the instructions may be executed to perform any of the methods indicated in this disclosure. In some examples, algorithms can be included as a subset of or otherwise as part of instructions included on computing system 110. Instructions can include algorithms to execute any of the methods or a subset of the methods described within this disclosure.

User interfaces on the computing system 110 may include a screen which allows a user to interact with computing system 110, such as a touch screen or buttons. A display can also be included such as an LCD, LED, mobile phone display, electronic ink, or other display to display information about computing system 110. The user interface can allow for both input from a user and output to a user. A communication interface(s) can include hardware and software to enable communication of data over standards such as Wi-Fi, Bluetooth, infrared, radio-wave, and/or other analog and digital communication standards. Communication interface(s) allow for computing system 110 to be updated and information generated by computing system 110 to be shared to other devices. In some examples, communication interface(s) can send information stored in memory to another user device for display, storage, or further analysis.

An application 118, or multiple applications, may be provided or running on the computing system 110. Some applications may perform or request write, read, or other operations to the memory 120 in logical sectors, which may also be referred to as logical blocks, in data chunk sizes, such as for example 512 bytes (512B), 4 kilobytes (4 KB), or other binary sizes. Application 118 may request a write operation to the memory 170 by, for example, issuing a memory write command to memory controller 171, and identify the logical sector to which the write operation should be performed. While the application 118 or computing system 110 may perform write operations using a logical sector, such as for example, by application 118 issuing memory write commands to memory controller 130 to write the 4 KB logical sector to the memory device 170, the memory controller 130 may write data to the flash memory devices in chunks of data that are pages, e.g., 16 KB. In other words, in some examples, the smallest chunk of data that can be written to the memory 170 may be a page.

Figure 2A:
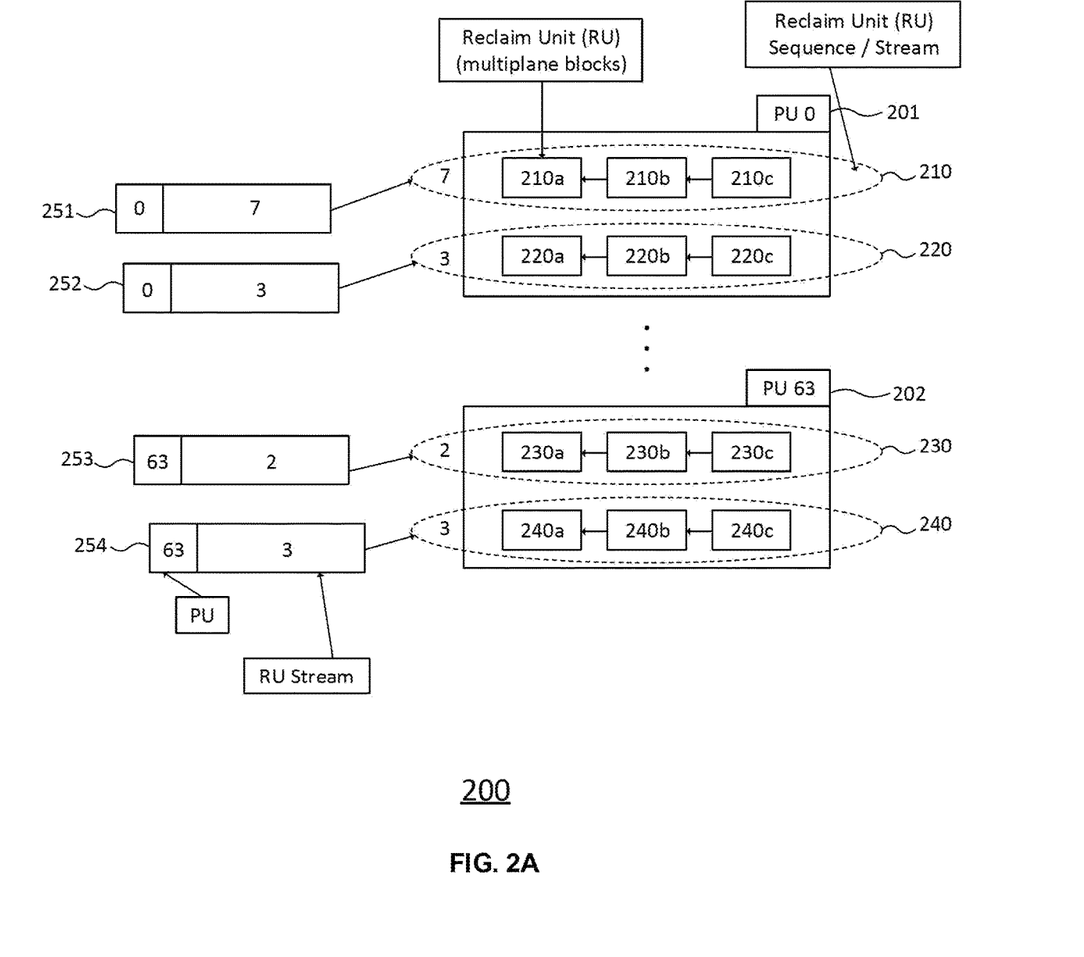
FIG. 2A illustrates a schematic diagram of a placement functionality or placement directive according to aspects of the disclosed technology.

FIG. 2A illustrates a schematic diagram of a placement functionality or placement directive which can be used by an application or computing system to place data within a memory storage device in a specified manner. The use of placement directives can allow an initial copy of data within a storage device to be placed in a manner which is most likely to be efficient from a garbage collection perspective.

Illustrated in FIG. 2A is schematic 200 illustrating parallel units (PUs) 201 and 202, reclaim unit sequences or reclaim unit streams 210, 220, 230, and 240, reclaim units (RU)s 210a, 210b, 210c, 220a, 220b, 220c, 230a, 230b, 230c, 240a, 240b, 240c, and placement IDs 251, 252, 253, and 254. A placement directive can be a coding or other schematic which encodes or allows for the storage of data or other information on a storage device using placement IDs described with respect to FIGS. 2A-2B.

In some examples, parallel units may be different SSDs, SMRs, or other memory units or drives. In some examples, the parallel units may be other smaller units of memory contained within a single memory drive. In some examples, a parallel unit is any unit which can be accessed in parallel and independent of other parallel units, so that commands, such a write command can be written to one parallel unit independent of other parallel units. For example, a single SSD may contain tens or hundreds of PUs.

Reclaim unit streams 210, 220, 230, and 240 can be "planes" within a PU to which data operations can be performed. In some examples, each reclaim unit may be a physical or logical division of an SSD or SMR drive which can be erased with a single operation, such as for example, a track or a block. In some examples, multiple tracks, blocks, or units collectively may form a reclaim unit stream.

Reclaim units are the logical or physical units which can be "reclaimed" or erased during garbage collection. In some examples, the reclaim units can be multiplane blocks.

In some examples, a placement directive can be similar to the functionality or operational of a "streams directive" as both directives can be used to isolate data which is being written in separate physical reclaim units (PRUs). Stated alternatively, in a "streams directive" data can be written into a "stream" rather than in the order of writes received written to a storage unit. Accordingly, this allows for data to be grouped according to streams, and the groups may be stored on separate physical units, such as parallel dies, blocks, or other physical unit of storage. In some examples, a stream ID map can be used to map a PRU on several or all PUs, which allows a single stream ID to achieve better read or write throughputs within the stream ID map. In addition, additional techniques can be used with the placement directive, such as striping techniques. For instance, wide striping or other data striping techniques used in conjunction with the streams directive can enable a drive to implement erasure coding across PUs, which may be desirable from a failure domain standpoint. Data striping is the technique of segmenting logically sequential data, such as a file or a stream, so that consecutive segments are stored on different physical storage devices. Striping is useful when a processing device requests data more quickly than a single storage device can provide it. Various methods of striping can be used such as round-robin striping between storage devices.

Additionally, while stream IDs within streams directives are assigned and managed by a host application or host program, and have no meaning to the storage device on which the data is stored, a placement directive can be interpreted or have meaning for the storage device. A placement directive encodes the specific PU on which data can be placed.

Placement directives can also enable a host program using a storage device to understand the boundaries of a reclaim unit on the storage device and also to enable that a reclaim unit can be smaller than the normal size. The placement directive allows a specific placement ID to be queried and the size of the current reclaim unit and the amount of data written so far into the reclaim unit to be returned in units of logical blocks.

In some examples, the stream granularity size (SGS) within a streams directive can be larger than that used in a placement directive or placement directive reclaim unit size (RUS). In some examples, the SGS can be the RUS multiplied by the number of PUs in the system. Stated alternatively, the RUS is smaller than the size of the SGS.

The placement directive also has provision for the host to understand the boundaries of the reclaim unit and for a given reclaim unit to be smaller than the normal size. The placement directive allows a specific placement ID to be queried and the size of the current reclaim unit and the amount of data written up until that point into the reclaim unit to be returned in units of logical blocks. The placement directive and other logic can be configured so that the number of logical blocks or other information related to the reclaim unit are returned only when no "writes" are outstanding for the specific placement ID.

In some examples, PUs supported by the drive and their specific channel topology, such as when used within storage area networks, can be discovered using the TP4052 log page parallel unit list mechanism.

A storage unit or storage drive using the placement functionality, which can be controlled by a host program using the drive, does not preclude the storage unit or storage drive from performing garbage collection. In placement mode, the drive can be controlled or otherwise being operated upon by using placement functionality. In host GC mode, garbage collection in the drive can be performed by the host through host garbage collection. In placement mode or in host GC mode, the drive is expected to move data for certain NAND management operations. In placement mode, the drive will also be doing a large amount of garbage collection on behalf of user write workloads. Drive-directed, rather than application directed, data movement needs RUs to place data in.

In some examples, the drive using the placement functionality can receive different signals or measurements relating to the actual or predicted use of data stored on the drive. These signals or measurements can be measured, for example by the host implementing the drive, and/or by other devices at various different layers of network connectivity. In some examples, signals or measurements, such as expected lifetime for data stored in the drive, are user-provided. Other example signals can include, for example, a predetermined priority level for different files or data objects. The priority levels can be relative to priority levels for other files or data objects, e.g., an object may have "high" priority for storage relative to other objects, which may have a different level or no level assigned.

In some examples, the placement directive may be used by the host application to keep data written through different namespaces in separate Rus. A namespace is a set of signs that are used to identify and refer to objects of various kinds. A namespace ensures that all of a given set of objects have unique names so that they can be easily identified. Namespaces can be structured as hierarchies to allow reuse of names in different contexts. To achieve data written through different namespaces in separate Rus, the placement directive can include a mechanism for the host to configure one placement ID per PU per namespace. In other words, the drive needs to have available for its use a RU to write to in any PU at any moment in time. To keep things isolated per namespace, the drive can be supplied with a namespace specific placement ID on each parallel unit. If these namespace-specific "write points" are not supplied, the drive can mix data between namespaces using a single drive internal set of RUs on each PU.

Figure 2B:
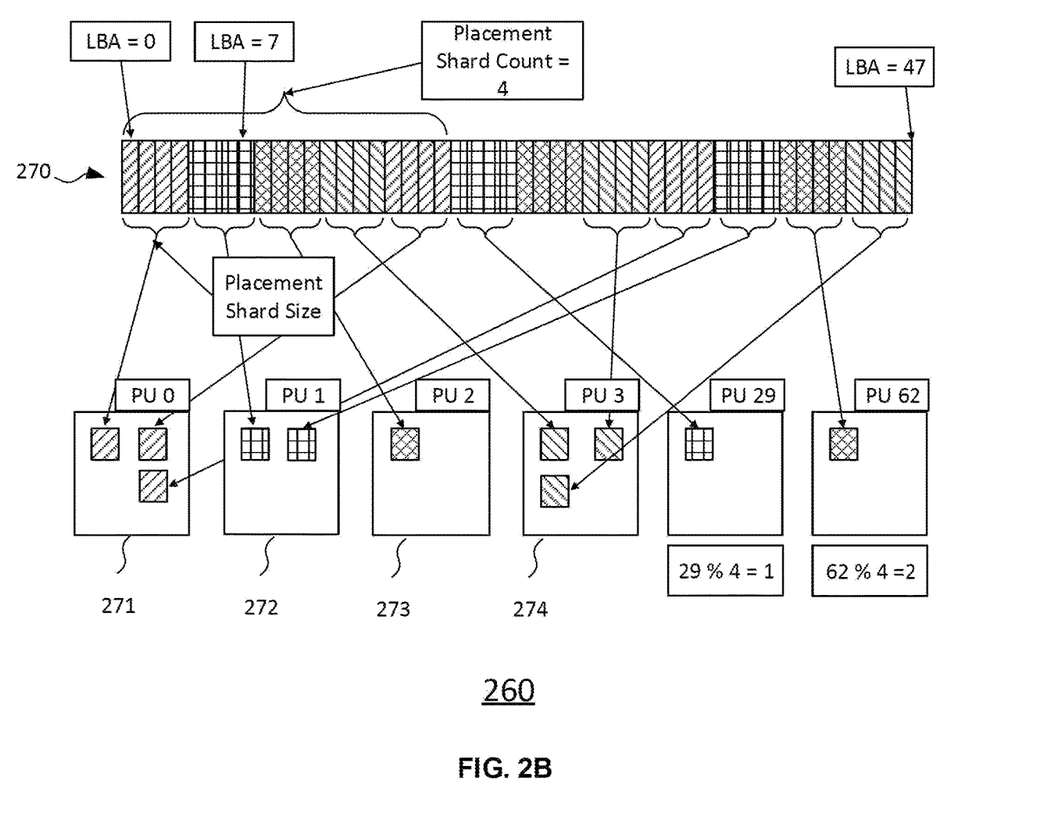
FIG. 2B illustrates a mapping of logical block units (LBAs) to internal CPUs and PUs according to aspects of the disclosed technology.

FIG. 2B illustrates a mapping of logical block addresses (LBAs) to internal CPUs and PUs. This mapping can exist to easily shard the workload. Sharding is the process of breaking up large tables into smaller chunks called shards that are spread across multiple servers. A shard can be a horizontal data partition that contains a subset of the total data set, and hence is responsible for serving a portion of the overall workload.

FIG. 2B illustrates forty-eight LBAs, collectively LBAs 270, and a number of placement units. For clarity, only 4 placement units are labeled as blocks 271-274 but it is to be understood that any finite number of placement units may be used. Similarly, any number of LBAs may be used. In FIG. 2B, a placement shard size of 4 is used. As illustrated in the example of FIG. 2B, a block of 4 LBAs is mapped into a single PU. For example, the first four illustrated blocks of LBAs 270 are mapped into block 271 (labeled PU 0). The cross hatching illustrated in FIG. 2B illustrates where each LBA is mapped to. As can be seen with reference to FIG. 2B, and as further explained below, the type of block from which a LBA originated is related to the modulus of the placement unit. A modulus or modulo function returns the remainder or signed remainder of a division, after one number is divided by another.

In some examples, a drive may use an erasure coding scheme to improve data reliability. In such cases the symbols used in the codeword are organized across PUs instead of within a PU. Simultaneously, striping data across PUs also makes the effective reclaim unit very large, which reduces or limits the efficiency of garbage collection. However, in cases with higher layers of redundancy within a drive, a higher error rate can be allowed for use cases in which a placement directive is used. Additionally, a vendor or manufacturer of a drive can determine how to meet requirements for small reclaim unit sizes and maintain a specified target error rate. In some examples, if a NAND storage device is reliable enough, the need for using a Redundant Array of Inexpensive Disks (RAID) format entirely can be possible. In other examples, applying RAID within a RU may be an option if incremental reliability is needed. In other examples, a drive vendor can determine which additional mechanisms can be used to maintain reliability while allowing for the use of a placement directive.

As explained with reference to FIG. 2B, sharding can be configured in relation to placement directives for optimal read and write throughput. The drive can export a placement shard size for striping data across PUs. As one example, to obtain optimal read and write output, a host may write 16 KiB to a placement ID, and then move to another PU on another channel. In another example, the host can write a full 128 KiB to a placement ID, and then move to a PU on another channel. The drive can be configured to export an additional parameter for use with placement functionality: a placement shard count (PSC). As one example, a rule can be applied in which every LBA is associated with a shard. A placement shard size (PSS) can be the number of shards placed within a parallel unit. The shard for a LBA can then be determined by computing (LBA/PSS) modulo PSC, where PSS illustrated in FIG. 2B with a "%" sign. Every PU also has an assigned shard computed as PU modulo PSC. A rule can further specify that an LBA can only be written to a PU assigned to the same shard ID. Additionally, exporting a PSC of 1 effectively expresses that there are no placement limitations.

Figure 3:
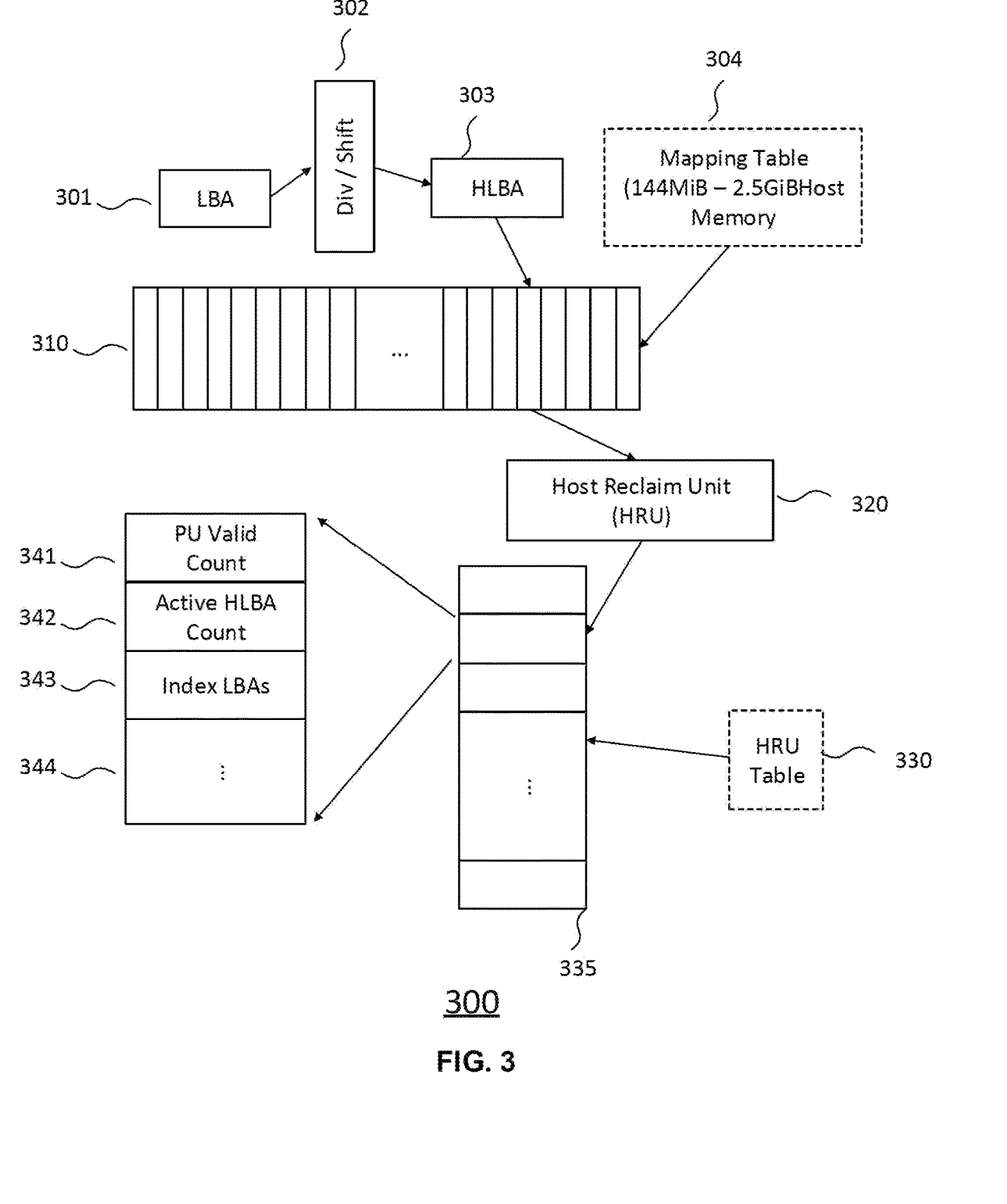
FIG. 3 illustrates a schematic illustrating a host flash translation layer (FTL) mapping and host reclaim unit data relationships according to aspects of the disclosed technology.

FIG. 3 is a schematic diagram of a system 300, including a host flash translation layer (FTL) mapping and host reclaim unit data. Further, explained with reference to FIG. 3 are various modes, elements, and functionality related which can be added to or related to the placement directive.

FIG. 3 illustrates LBAs 301, host logical block addresses (HLBAs) 303, a shift 302 between LBAs 301 and HLBAs 303. A mapping table 304 can exist within host memory 310. A host reclaim unit (HRU) 320 can exist within host memory 310 and be mapped to a memory 335. A section of memory 335 can include PU Valid Count 341, Active HLBA Count 342, Index LBAs 343, and other information 344. As further explained below, these elements can be used to enable placement mode and allow for host GC modes. Information related to HRU 320 and other HRUs can be stored within an HRU table 330, which can be maintained on memory 335.

Drive Host GC Functionality

In some examples, a program using a drive can take charge of garbage collection, referred to as Host GC Mode. Additional elements or functionality can be added to the drive functionality to enable host GC mode. In some examples, a "rewrite" operation can be added. A rewrite operation can take as inputs a logical block range and information related to a placement directive. The rewrite operation can read data and write a current copy in a specified PU/HRU as indicated by a placement directive.

In addition to the rewrite command, the host may also require a mechanism to determine what data is active in each RU during a system reboot. For this reason, the drive may need to support the ability to query its logical block mapping table.

Placement Mode

The initial placement of data by a host onto a drive can be referred to as placement mode. The initial copy of data can be placed on the drive in HRUs in a manner that is most likely to be efficient from a GC perspective. When placing data initially, a high GC efficiency can be achieved as the need to copy or move a large amount of data within a drive can imply that a garbage collection efficiency will suffer.

In placement mode, the host uses the placement functionality described above and information from the application to determine where to place data. If the host has data to write with low read and write performance requirements, an expected correlated deletion time, and a size on the same order of magnitude as the reclaim unit size, it can be written to a single placement ID, such as one or more RUs on a PU. This will give the best GC efficiency while still meeting performance requirements. It also allows much more isolation with the same resources.

For example, in a system with 64 PUs, obtaining full device throughput requires a placement ID on each PU, and isolating two different sequences of full performance data requires two times the resources. With the PU local data layout, 64*2, or 128 sequences of low performance data can be kept isolated with the same resources as two sequences of high-performance data (or two streams resources). If performance requirements for individual data sequences are low, this isolation capability can result in significant garbage collection efficiency improvements.

In addition, the host can steer data based on its expected lifetime and performance requirements to a set of the available placement ids. The GC efficiency and performance requirements of the data can be effectively traded off. Expected lifetime and performance requirements can be received as signals or measurements, for example that are user-provided.

In placement mode, the drive is expected to manage the NAND. This means moving data around to combat read disturb and retention effects as well as to ensure wear leveling. The host will write data roughly evenly to all PUs, but it will not track HRU occupancy. This means that over time some dies, blocks, or other storage divisions may end up with more active data (active LBAs) than other dies. The drive will need to copy data between PUs to combat this as well.

Placement mode is like NVMe streams with more flexibility exposed to the host.

Host GC Mode

As explained above, writing data in host GC mode uses the mechanisms described above. Similar to the objectives and tradeoffs of initial placement discussed in the placement mode description above, similar tradeoffs and goals are still applicable in host GC mode.

In host GC mode, the host also implements a garbage collection algorithm in addition to the placement logic. The host can guarantee that a certain minimum number of HRUs have no valid logical blocks on each PU in the drive. In the host GC mode, the overall purpose is to ensure that GC copy operations generally do not need to be issued by the drive and can rather be controlled by the host. The host GC algorithm makes data placement and GC candidate selection decisions. This enables the GC algorithm to be tightly coupled with an application using the data.

In order to accomplish host GC in an efficient manner, the host can maintain two critical pieces of information. The host can be able to determine how many active HLBs exist in a HRU and can also be able to retrieve a list of the remaining active HLBAs that exist in a HRU. It does this by maintaining a host logical block address (HLBA) to host reclaim unit address (HRUA) mapping table. For example, a host can maintain HLBA 303 and addresses within HRU 320. A count of active LBAs, such as LBA 301, per HRU can be maintained and anytime the mapping table is updated, the relevant HRU counts are updated. For the second requirement, a small amount of storage is used to store HLBA index information for the HRU, such as HRU 320, in the drive. This can be written into the same placement ID as the data, so it can be stored within the same HRU as the data it describes. When the list of remaining HLBAs for a reclaim unit are needed, the index can be read and filtered through the mapping table to determine the HLBAs that are still in active use in the reclaim unit.

The larger the HLB size, the smaller the host memory required for the table. For example, on a drive with 4 TB of capacity with a reclaim unit size of 24 MiB, a HLB size of 4 KiB would require a roughly 2.5 GiB table. With a HLB size of 64 KiB, the memory requirement would be 144 MiB.

When the host GC algorithm determines that is must evacuate a HRU to make room in an SSD or other type of storage drive, it can get the list of active HLBAs and then issue a new 'rewrite' drive command to cause the drive to read the LBAs covered by the HLBA and write them back out to a new HRU using a placement ID.

The host is not required to do any NAND management. The drive itself is expected to relocate data in a reclaim unit (RU) when needed due to retention, read-disturb, or wear leveling. When data is relocated, there is no requirement to keep the data in the same parallel unit. To the extent that NAND management necessitates movement of data, the host based HRU tracking need not consistently represent data that is co-located in a physical RU. However, in such examples, a follow-on effect on the drive can be the drive potentially performing its own or additional GC.

For example, if the application write rates are less than or around 10% of the physical media per day, the disagreement between HRU and physical reclaim unit content will result in the drive making more of the GC decisions and these may not be optimal as compared to the host garbage collection. Under these circumstances, however, the overall write rate is low and sub-optimal decisions have minimal impact. Despite this, the drive can still achieve much more than its design lifetime and the bandwidth lost due to write amplification is minimal and need not be a major consideration. The simplicity achieved through not having to deal with NAND effects can be beneficial. If the host write rate is high, any divergence in the HRU and PRU will quickly go away as data is rewritten. They will tend to reconverge over time.

While the drive can be expected to do any and all operations to ensure NAND management is correct, the host is not precluded from doing this as well. For example, in one implementation, the host GC will factor PU wear leveling fairness into its decisions on data placement to avoid wear leveling moves by the drive. In addition, the host GC will likely make some small percentage of GC rewrite operations on a random or age-related basis to help with wear leveling within a PU. Neither of these are strict guarantees but are instead assistance.

Further, when the system reboots, the HLBA to HRU tables may be reconstructed. The index information can be accessed to see what data exists in each HRU, but when multiple copies of a LBA exist on the physical media, it gives no indication of which one is the latest. For this reason, the drive is expected to support a mechanism to export the current LBA to the flash address mapping table. For example, as illustrated in FIG. 3, memory 335 contains PU valid count 341, active HLBA count 342 and index LBAs 343. In addition to being necessary for initializing the host GC data at system startup, this information is also valuable for debugging layout related performance issues.

Finally, in host GC mode, an acceptable drive error rate is higher as compared to drive-controlled read, write, and garbage collection operations. In some examples a uniform bit error rate (UBER) of 1 in 10^47 bits read in all modes may be desired yet in host GC and placement mode higher level error correction can relax the UBER requirement while maintaining reliability of data operations to achieve GC efficiency gains.

Figure 4:
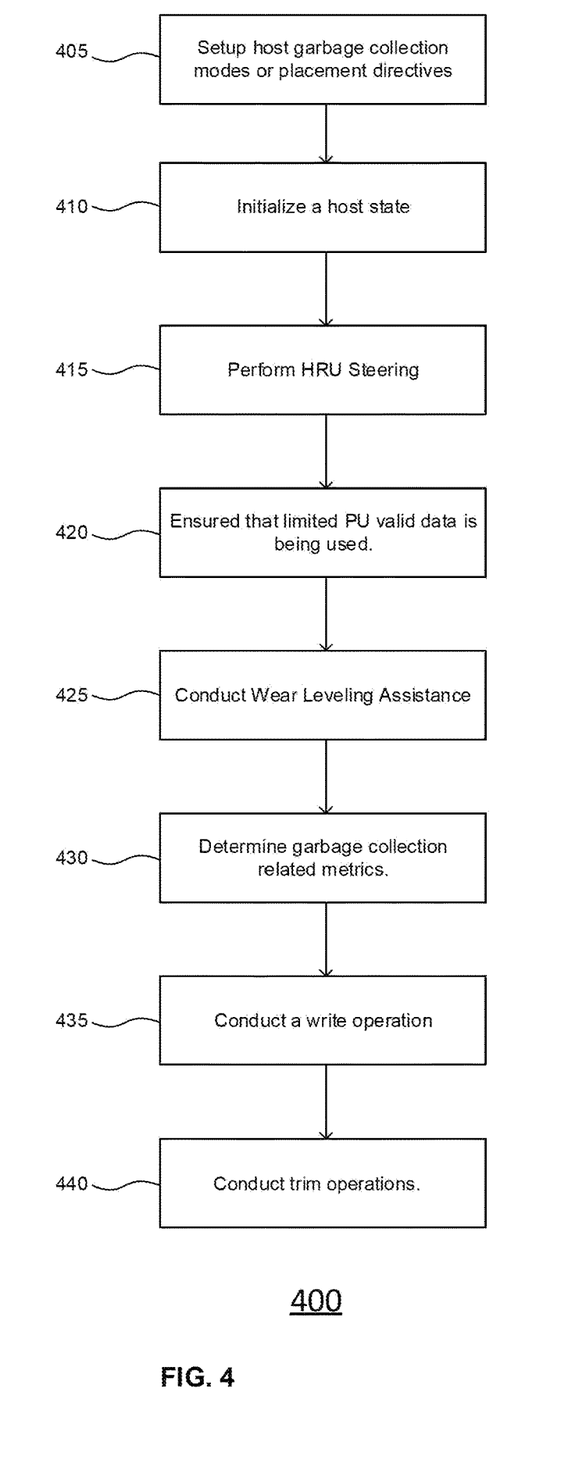
FIG. 4 illustrates an example method related to set up and use of placement directives and related garbage collection functionality according to aspects of the disclosed technology.

FIG. 4 illustrates an example method 400 related to host use of placement directives and host garbage collection modes. While the operations of method 400 are described below in a particular order, it should be understood that the order may be modified or operations may be performed simultaneously. Additionally, operations may be added or omitted.

At block 405, host garbage collection modes or placement directives can be set up. Further, namespaces can be set up and formatted. In addition, the placement directives described herein can be enabled. A host GC logic can perform its own setup operations related to the drive. For example, the setup operation can include retrieval of a number of parameters from the drive, determining the HLBA range that will be used by application software after accounting for the garbage collection reserve, the maximum active RU per PU without drive GC, and reserve addresses used for HRU index information storage. This information will be written to the drive for retrieval during normal startup operations.

At block 410, a host can first initialize its state. This block can occur before enabling writes and/or deallocates to a drive-in host garbage collection mode. The host can first read the setup information to retrieve its basic configuration.

At block 415, HRU steering can occur. When a write arrives at the host GC logic, the logic can decide where to place the data. Specifically, the logic can determine the PU and HRU stream the data should or can be written to. If the request crosses a naturally aligned placement shard size, it can be first broken up into separate requests that do not cross these boundaries.

Additionally, at this block, such as when determining where to place a write, an application interface can be used by the host. The application interface exposed to the host logic can include information related to the specific drive, host, and storage type. Non-limiting factors which can be used when determining to which PU and HRU stream to write can include: (i) the application read and write performance requirements of the data being written; (ii) the expected lifetime of the data and/or deletion correlation with any other data currently being written; (iii) the expected sequential object size of the data being written; (iv) maintaining the number of bytes written to each PU roughly even; (v) maintaining the number of active LBAs on each PU roughly even and absolutely below a set cap; and/or (vi) meeting the PU constraints of the drive specified by the reported placement shard count. Additional constraints and considerations are described herein.

At block 420, it can be ensured that limited PU valid data is being used. At this block, the host can control PU level placement using the placement directive described above.

For example, the host could write an entire namespace of LBAs to one PU, or if PSC>1, e.g., greater than 1, to placement share count Pus. In this example, the drive can be expected to move or garbage collect data away from the target Pus as needed. In some examples, the host may effectively spread active LBAs across all the Pus. A random workload that is written round robin across Pus will result in some variance in active data (LBAs) on each PU, which would result in a binomial distribution. Yet, a sequential workload written round robin across Pus will not show the required variance. A problematic workload written round robin could potentially write almost all its data to one PU. To overcome these issues, the host GC logic can require a mechanism to allow round robin placement to the extent that active LBAs remain within expected balance on Pus. Once a Pus active LBA count moves beyond this expected limit the PU can be skipped in round robin allocation. If a PU is just slightly beyond the limit, the percentage of writes that skip the PU in round robin allocation can be small or within a pre-determined range.

In some examples, the rate of skipping can ramp up as the number of active LBAs exceed the limit by greater margins. For example, an algorithm can track an active LBA count of each PU relative to the mean of all LBAs. When the active LBA count on a PU exceeds the mean by a small, predetermined percentage, a small percentage of writes that would normally target the PU skip it. The skip percentage can increase exponentially as the active LBAs on the PU increase further beyond the mean until the PU is excluded entirely from new writes. In some examples, a similar, but reversed logic could be applied to selecting GC source candidates and moving them off the PU, such as further explained below.

At block 425, wear leveling assistance can take place. At this block, the drive can assist the host in ensuring even wear of the physical units within the storage unit or storage drive. To the extent that host allocation is done performing round robin among PUs, PU wear can be expected to be fairly even across all PUs. Yet, some data may be much longer lived than other data within the PU, which may result in the drive moving data around to ensure even wear of the NAND flash.

In some examples, the host GC algorithm can attempt to minimize the amount of writes the drive needs to do in order to reduce interference, improve performance, and improve GC efficiency. For example, the host can periodically select HRUs that contain expected long lived data for copy operations as a way to help the drive keep wear balanced among PUs and minimize the need for unilateral drive data move operations.

At block 430, garbage collection related metrics can be determined.

At this block, host GC logic can actively monitor the effective write amplification of a given class of writes to determine how much GC work to accomplish on behalf of each write. Several considerations can be included in such a determination. The first can be to always ensure the minimum free HRU target is met. This is to prevent the drive from needing to copy data to make room for new writes. An additional consideration is to avoid a big spike in GC work as the drive or storage unit gets closer to the free HRU limit. This can ensure the write throughput seen by the application is not "bursty."

Additionally, a cost for each class of writes can be determined with the amplification they are actually incurring or would incur. For example, a "well behaved" large sequential write workload going to its own placement ID should not be slowed down by another workload with high write amplification factor (WAF) going to a different placement ID. Write amplification is a phenomenon associated with flash memory and solid-state drives where the actual amount of information physically written to the storage media is a multiple of the logical amount intended to be written.

Additionally, at the time when costs related to writes have been determined, the host GC logic can also determine or have determined how many logical blocks it would need to garbage collect. Often, there can be a currently selected source HRU to be reclaim as part of garbage collection. However, when a new source HRU is needed for reclaim, it can be selected based on, for example, the amount of active data in the HRU, PU wear leveling information, the total active LBA count in the source PU, and knowledge about the expected lifetime of the data in the HRU. Once selected, the source can be entirely relocated before selecting a new one.

When determining a starting point, selecting source HRUs with minimum active LBA counts can be most efficient and chosen by the host GC logic. At this stage, a free RU can be generated for the minimum number of costly copy operations. Also, periodically selecting a fuller block that is long lived as a GC source can help with wear leveling.

In some examples, such as when the long lived "block" persists for a long time without being fully filled with active LBAs, it can also be used to assist with write amplification. Further, periodically choosing source GC targets on source PUs that are out of the target active LBA count operating range can help keep the valid data on PUs even.

In some examples, once a source HRU is selected, the host can read the index data associated with it and cross reference the HLBA list with the HLBA to HRU mapping table to generate a list of active HLBAs that need to be moved.

At block 430, a target HRU can also be selected for GC. With the placement directive, this amounts to identifying a placement ID to write data to. With the exception of source selections for PU fullness and cross PU wear leveling, moves can be kept within the same die. Depending on the application using the storage, there may be more than one GC target placement ID per PU. Once the source and targets for host GC are identified, drive rewrite commands can be issued with the relevant LBAs and the correct placement ID identified.

At block 435, a write operation can take place. Once all the above considerations have been made, the shard size (or smaller) write units are sent to the relevant PU/HRU streams using the standard NVMe write command with the placement directive. The HLBA to HRU mapping table is updated, HRU active HLBA counts are updated, and active LBAs per PU are updated.

At block 440, trim operations can occur. Trim or deallocate operations through the host GC logic may only require doing a small amount of additional operations to those described above. For example, the operations may require an update of the relevant HLBA to HRU mapping table entries to indicate unallocated state. Further, the operations may need to update the HRU active HLBA counts and the active LBA count per PU. The deallocate operation is then sent to the drive.

With respect to FIG. 4 or method 400, read operations are not processed by the host GC logic and can be sent directly to the drive.

As used in this disclosure, host refers to a host can be a server or computer, or a software running thereon, such as for example computing system 110, or any combination of components described with respect to computing system 110, which can for example, control, add information to, perform read or write operations, or operate in conjunction with storage or memory. In some examples, applications can run on the host.

While this disclosure contains many specific implementation details, these should not be construed as limitations on the scope of what may be claimed, but rather as descriptions of features specific to particular examples. Certain features that are described in this specification in the context of separate examples may also be implemented in combination in a single implementation. Conversely, various features that are described in the context of a single implementation may also be implemented in multiple examples separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the examples described in this disclosure may be readily apparent to those skilled in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

The invention claimed is:

1. A method of storing data, by a host device, in a memory, the method comprising:
   receiving, by the host device, information related to data to be written to the memory;
   analyzing, by the host device, the received information related to the data to be written to the memory;
   selecting, by the host device based on the analyzed information, one or more placement identifiers (IDs) on which to store the data; and
   writing by a memory controller, responsive to a command by the host device, the data within an area of the memory corresponding to the one or more selected placement IDs, and
   wherein the selection of the one or more placement IDs by the host device is based on at least maintenance of a total number of active logical block addresses across parallel units to be below a set parameter and spreading the active logical block addresses among the parallel units such that when an active logical block address count on a parallel unit exceeds a mean number of active logical block addresses for the parallel units by a predetermined amount, a number of writes that would normally target the parallel unit instead skip the parallel unit.

2. The method of claim 1 wherein each placement ID of the one or more placements IDs uniquely identifies a combination of one of the parallel units and a reclaim unit stream within the one parallel unit.

3. The method of claim 2 wherein the reclaim unit stream comprises one or more reclaim units, wherein each reclaim unit is a logical division of the storage and is erasable through a single erase operation.

4. The method of claim 3 wherein the reclaim unit corresponds to a physical reclaim unit.

5. The method of claim 3, further comprising querying the one or more reclaim units to obtain information about the data stored on the one or more reclaim units.

6. The method of claim 1, wherein the selected placement ID is chosen by the host device based on a garbage collection operation metric that is related to the data to be placed on the area of memory corresponding to the one or more selected placement IDs.

7. The method of claim 1, wherein the host device can initiate a garbage collection operation within the area of memory corresponding to the selected placement ID.

8. The method of claim 7, wherein the garbage collection operations for areas outside the selected placement ID are performed by the memory controller.

9. The method of claim 1, wherein commands for reading the data written to the storage are sent directly to the memory controller.

10. The method of claim 1, wherein disk maintenance operations are conducted by a drive controller.

11. The method of claim 1, wherein the placement ID is logically addressable by the host device.

12. The method of claim 1 wherein analyzing information related to the data includes at least one of:
(i) determining read and write performance requirements of the data to be written;
(ii) determining an expected time to deletion of the data to be written; or
(iii) comparing the size of the data to be written to the size of a reclaim unit within the area of memory corresponding to the one or more selected placement IDs.

13. A system comprising:
a storage device;
one or more processors coupled to a memory containing instructions, the instructions causing the one or more processors to:
receive, by the one or more processors, information related to data to be written to the storage device;
analyze, by the one or more processors, the received information related to the data to be written to the storage device;
select, by the one or more processors based on the analyzed information, one or more placement identifiers (IDs) on which to store the data; and
write, by a storage device controller, responsive to a command by the one or more processors, the data within an area of the memory corresponding to the one or more selected placement IDs,
wherein the selection of the one or more placement IDs by the one or more processors is based on at least maintenance of a total number of active logical block addresses across parallel units to be below a set parameter and spreading the active logical block addresses among the parallel units such that when an active logical block address count on a parallel unit exceeds a mean number of active logical block addresses for the parallel units by a predetermined amount, a number of writes that would normally target the parallel unit instead skip the parallel unit.

14. The system of claim 13, wherein each placement ID of the one or more placements IDs uniquely identifies a combination of one of the parallel units and a reclaim unit stream within the one parallel unit.

15. The system of claim 14, wherein the reclaim unit stream comprises one or more reclaim units, wherein each reclaim unit is a logical division of the storage and is erasable through a single erase operation.

16. The system of claim 13, wherein the one or more processors can initiate a garbage collection operation within the area of the storage device corresponding to the selected placement ID.

17. The system of claim 13, wherein commands for reading the data written to the storage are sent directly to the memory controller.

18. A method of creating a placement identifier (ID) for use by a host device comprising one or more processors, the method comprising:
identifying, a parallel unit within a storage device;
identifying a plurality of reclaim unit streams within the parallel unit;
creating the placement ID for each reclaim unit stream of the plurality of reclaim unit streams, the placement ID logically addressable by the host device and corresponding to an erasable section of storage within the storage device; and
storing, in a host device accessible database on the storage, the placement ID,
wherein the creation of the placement ID for each reclaim unit stream is based on at least maintenance of a total number of active logical block addresses across parallel units to be below a set parameter and spreading the active logical block addresses among the parallel units such that when an active logical block address count on the parallel unit exceeds a mean number of active logical block addresses for the parallel units by a predetermined amount, a number of writes that would normally target the parallel unit instead skip the parallel unit.

19. The method of claim 18, further comprising storing at least one of a host device logical block address, a logical block address, or host device reclaim unit address related to the placement ID in the host device accessible database.

* * * * *